3,191,499
CUTTING TOOL
Frank A. Solski, 8442 Hazelton, Dearborn, Mich.; Ted Paczas, 1925 Forest Lane, Birmingham, Mich.; and Roy R. Gyger, 14098 Dale, Detroit, Mich.
Filed Sept. 6, 1962, Ser. No. 222,767
2 Claims. (Cl. 90—11)

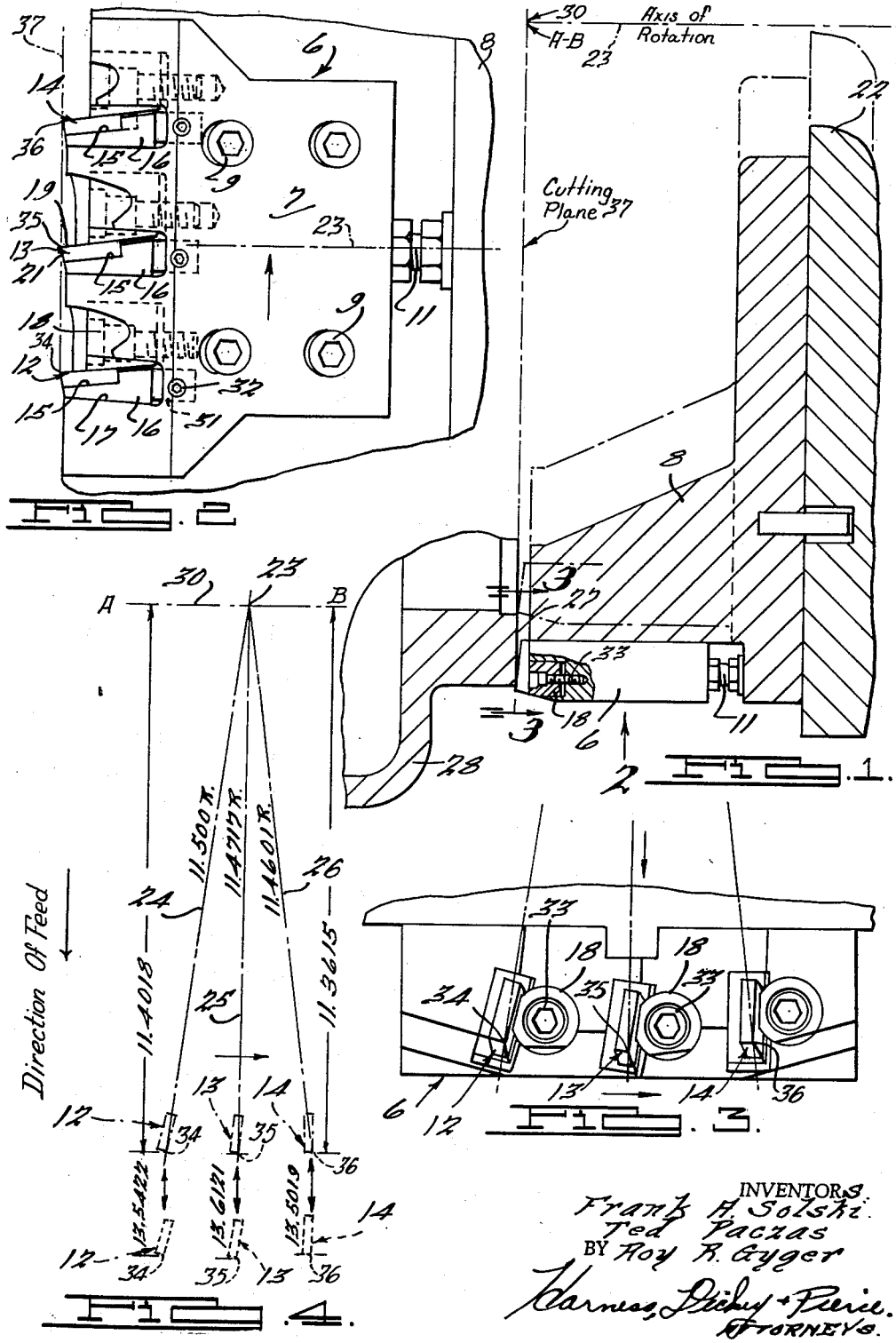

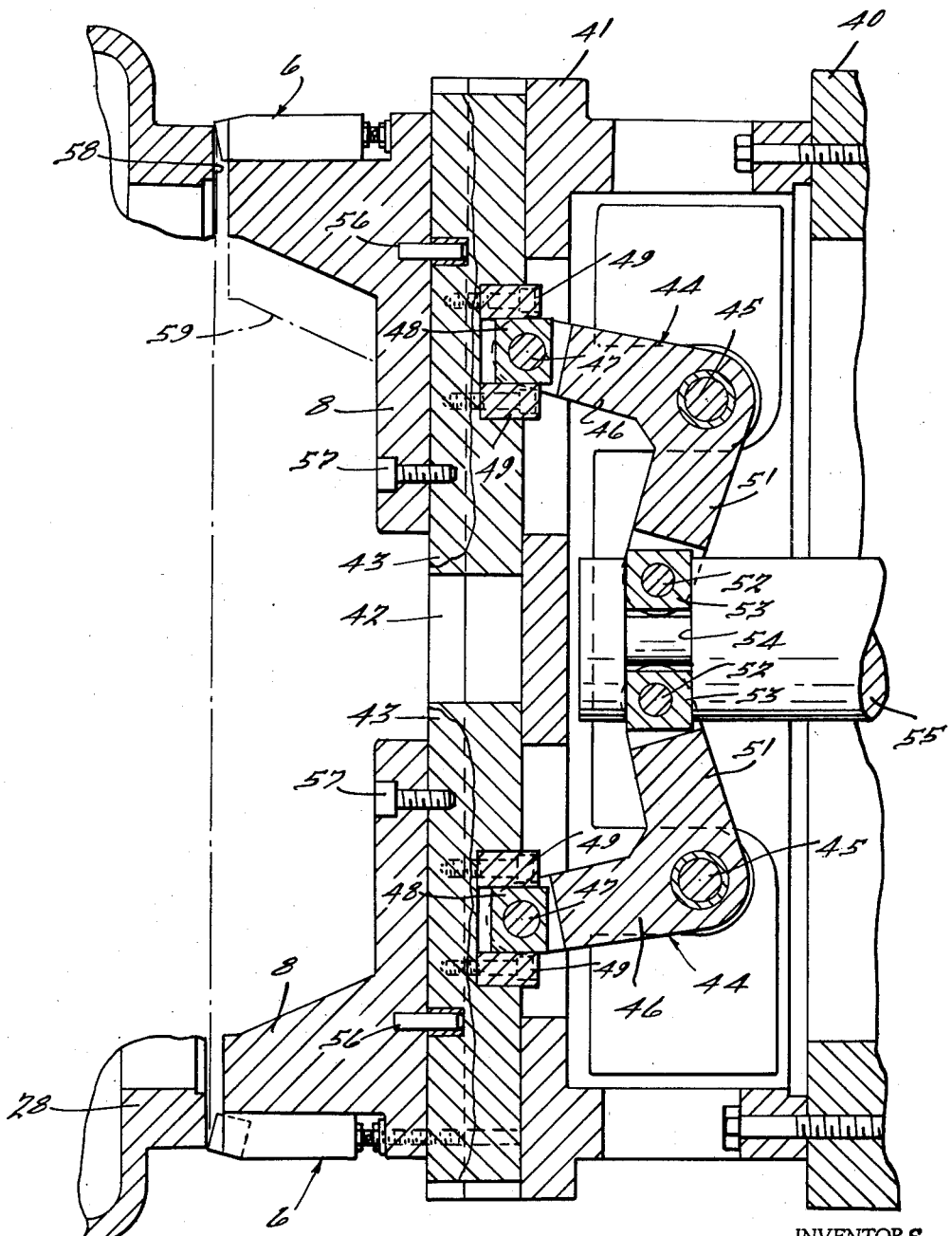

This invention relates to material removing tools, and particularly to a multiblade tool for machining a surface, and is a continuation-in-part of Serial No. 787,548, filed January 19, 1959, now abandoned.

The tool of the present invention comprises a body portion having slots and adjacent recesses for receiving cutting blades and elements which clamp the blades in position. Preferably a carbide blade is employed of predetermined thickness, mounted in a manner to produce the proper rake and clearance angle, and the sum of the chip load on all of the blades is substantially constant. The tool and work are relatively rotated and one is advanced relative to the other over the face to be machined in the manner of a spiral as it is progressively advanced outwardly over the face of the edge. The body is of a width to support a plurality of the blades and the rearmost blade of the series in relation to the relative movement will be disposed on a greater radius relative to the center of the head than the blade disposed forwardly thereof. The second blade in advance of the first blade in like manner will be disposed on a greater radius than the blade ahead, which will be the third blade, which third blade will be disposed on a greater radius than the fourth blade, etc. This is true of the series of blades whether two, three, four, five or more blades are mounted in the supporting body. With this arrangement, the rearmost, or number one blade, will engage the work first, and during the first revolution the preceding blades will pick up and cut their portion so that eventually all of the plurality of blades will be cutting. It is evident that if the forward blade of a series relative to the direction of rotation engaged the workpiece first, the following teeth would never be in a position to have cutting engagement therewith.

Accordingly, the main objects of the invention are: to provide a tool for rapidly removing stock from a workpiece while providing a surface of desired finish; to provide a cutting tool having a plurality of blades so located that the rearmost blade relative to the direction of circular advancement of the tool will have a greater radius than the blade disposed therebefore; to provide a tool with a plurality of blades so located as to have the rearmost blade initially contact and machine the workpiece as other of the blades disposed in advance thereof progressively engage and machine the workpiece ahead of the rearmost and the first-to-cut blade as the tool supported head rotates and is radially advanced; to provide a cutting tool with a plurality of blades so located that during a cutting operation the blades will progressively machine the workpiece as it is rotated and radially advanced over the surface of a workpiece to be machined, and, in general, to provide a cutting tool for machining the face of a workpiece in a rapid and efficient manner.

Other objects and features of novelty of the invention will be specifically pointed out or will become apparent when referring, for a better understanding of the invention, to the following description taken in conjunction with the accompanying drawings, wherein:

FIGURE 1 is a sectional view of a tool mounted on a radially movable head secured to a rotatable drive arbor;

FIG. 2 is a view in elevation of the tool shown in FIG. 1, as viewed from point 2 thereof;

FIG. 3 is a sectional view of the structure illustrated in FIG. 1, taken on the line 3—3 thereof;

FIG. 4 is a schematic view of the cutting blades of FIG. 1 shown in relation to each other before and after a machining operation, and FIG. 5 is a sectional view from which the structure of FIG. 1 has been taken.

Referring primarily to FIGS. 1, 2 and 3, a cutting tool 6 is illustrated having a body 7 which is secured to a support 8 by screws 9 in a manner to produce an accurate setting of the body relative to the support 8 by the adjustment of the stud 11. The body has a plurality of blades 12, 13 and 14 mounted in slots 15 in holders 16, each of which is disposed in a slot 17 disposed inwardly from the end of the body 7 and secured in position by a clamping element 18. The blades 12, 13 and 14 are mounted to have the inner ends tilted forwardly of the direction of circular movement of the blade to have the face 19 produce a negative rake with the surface and the bottom face 21 clearance therewith. The positioning of the blades will vary for different material of the workpiece to be machined.

It will be noted from FIG. 2 that the corners 34, 35 and 36 of blades 12, 13 and 14 are all aligned in a cutting plane 37 so as to be capable of machining a flat face 27 on a workpiece and may be otherwise mounted to machine surfaces other than flat. The blades are, however, set at different angles and on different radii from the center of rotation of the rotatable driving element 22 of the machine. Assuming this center to be at the point 23 of FIG. 4, then the radius 24 of the corner 34 of the blade 12 is greater than the radius 25 of the corner 35 of the blade 13 which is greater than the radius 26 of the corner 36 of the blade 14. This difference in radial disposition of the blades places them in stepped relation to each other, as clearly illustrated in FIG. 4, so that they will cut seriatim as they are advanced over the surface to be machined. The face 27 of the illustrated workpiece 28 to be machined is circular, although a solid or a hollow surface of any shape and other than flat may be machined by the cutting tool 6. Besides the relative circular rotation of the tool and workpiece, the tool and workpiece are relatively advanced to have the blades pass over the surface to be machined. This is accomplished by moving the workpiece over the tool or advancing the tool radially over the workpiece as it is rotated, as pointed out above.

In FIG. 1 it will be noted that the tool 6 moves from the inside outwardly across the face 27 as the supporting element 8 is advanced radially outwardly while being driven in rotation by the driving element 22. During the rotation of the driving element 22 and the radial advancement of the tool supporting element 8, initial contact will occur between the blade 12 disposed on the greater radius and the inner edge of the face 27 of the workpiece. As the element 8 is advanced a predetermined distance during a single revolution, the blade 13 will begin to cut, and upon further rotation and advancement of the support 8 during said revolution, the blade 14 will engage and cut the face 27 of the workpiece. After the blade 12 initially engages and machines the face 27, the blades ahead of the blade 12 will engage seriatim and thereafter machine simultaneously each revolution, one blade removing material ahead of the blade in rear thereof relative to the circular advancement of the tool. Thus, as the tool is revolved, the blade 14 will cut its share of material from the face 27 in advancement of the blade 13, while the blade 13 will be cutting its share of material ahead of the blade 12 which will cut its share of material ahead of the blade 14 in a circular direction. It will thus be seen that it is not only desirable but necessary to have the blade of greater radial disposition follow blades of a series of less radial placement when considered in the direction of the circular advancement of the tool. The radius of location of the blade has been selected to have each of the blades cut as nearly as possible its proportionate share of the material as the chip load of the different blades changes during the advancement of the tool, the sum of the loads on the blades being substantially constant.

For example, the radius of the corner 34 of the blade 12 is 11.500", the radius of the corner 35 of the blade 13 is 11.4717", and the radius of the corner 36 of the blade 14 is 11.4601" in the example herein illustrated in FIG. 4. These figures cover the simple three-bladed tool illustrated by way of example, and it is to be understood that tools with two or more than three blades will be similarly calculated. The radius of the cutting point 34 of the blade 12 from the center 23 is 11.500" and the distance of the point 34 from the line 30 will be 11.4018". Line 30 is a line on the cutting plane 27 disposed perpendicular to the axis of rotation 23 and is perpendicular to the direction of feed of the cutting tool. Line 30 is only used in calculating the relative position of one cutting point to another. The distance from the cutting point 35 of the blade 13 to the center 23 and to the line 30 will be the radius of the point which is 11.4717". The radius of the cutting point 36 of the blade 14 from the center 23 is 11.460" and the distance of the point 36 from the line 30 is 11.3615". The dotted line position of the blades 12, 13 and 14 illustrates their distance from the line 30 when the blades 12, 13 and 14 have been advanced 2.1404" to complete the machining operation.

The following relationship pertains to two different rates of feed advancement per revolution of the tool, the one for .0520" and the other for .0577":

*Chip thickness*

FOR .0520" FEED/REV.

| Blade corners | Start | Middle | End |
|---|---|---|---|
| No. 34 | .0283" | .0200" | .0129" |
| No. 35 | .0116" | .0200" | .0271" |
| No. 36 | .0121" | .0120" | .0120" |
| Total | .0520" | .0520" | .0520" |

FOR .0577" FEED/REV.

| Blade corners | Start | Middle | End |
|---|---|---|---|
| No. 34 | .0283" | .0200" | .0129" |
| No. 35 | .0116" | .0200" | .0271" |
| No. 36 | .0178" | .0177" | .0177" |
| Total | .0577" | .0577" | .0577" |

It will be seen that the different blades take a larger or smaller cut at different points in their advancement across the face 27 from the start to the finish position of the blades. These cuts average out and all fall within the safety limits of the blades' strength to withstand the load of the thickest chip. By distributing the load produced on the blades in their different positions of advancement, a maximum amount of material may be cut each revolution within the factor of safety of the blades.

To accurately position the blades and cutting points relative to each other, locating pins 31 are placed in apertures in the bottom of the slots 17 and secured in position by setscrews 32. The blades herein illustrated, being square, will produce eight cutting corners which are made available by loosening the screws 33 and the clamping blocks 18 so that the blades 12, 13 and 14 may be rotated to a new position 90° from the last position and after the four corners are dulled on one face, the blades are turned over so that the four corners associated with the other face may similarly be employed. With the holders 16 engaging the blades, the tightening of the screws 33 will clamp the blades 12, 13 and 14 in exact pre-set position so that the selected corners 34, 35 and 36 may be employed for cutting the face 27.

It is to be understood that two or more blades may be secured in a body 7 in any manner so long as the rearmost blade, such as blade 12, will be disposed on the greatest radius to contact and machine the face of the workpiece first, followed by the machining by the blade or blades ahead thereof progressively upon the further revolution of the tool and the relative advancement of the tool and workpiece. Thus, after the first revolution, each forward blade relative to the circular advancement will cut prior to the following blade as the body is revolved over the surface being machined and advanced progressively each revolution a predetermined amount conforming to the sum of the chip thickness of the blades throughout the advancement over the face being machined in the cutting plane 37. In this manner, rapid machining will take place, with the load on the blades maintained within a factor of safety, the loads changing on each blade for different advanced positions thereof during the cutting operation.

As is evident from FIGS. 2 and 3, the blades are tilted rearwardly so that only the corner cutting edge 34 of the blades performs the machining operation, and with this relationship the eight corners of the blade will be available to separately perform the machining operation until dulled. After all the points have become dulled, a new set of sharp blades of the same size as the original ones which had become dulled will be substituted therefor. It is to be understood that the angular position of the blades will change for the different material and shape of the workpiece to provide the proper rake and relief angles to the cutting edges. Various feed movements may be employed by moving the tool or the workpiece, or both, in, out and/or across the workpiece area to be machined. While reversible blades are herein illustrated and described, it is to be understood that blades may be provided for each station that are individually sharpened and reset on the body after being dulled. In any arrangement, a constant chip removal occurs with a constant feed maintaining the sum of the loads on the blades substantially constant as the load on each individual blade varies within the factor of safety of the blade material during the relative feeding of the tool.

In FIG. 5, a rotatable table 41, secured on a driven support 40, is illustrated as having spaced undercut ways 42 thereon in which flanges of slide plates 43 are mounted for movement toward and away from each other. A pair of bell cranks 44 is pivoted on the table 41 on the pivots 45. Each outwardly extending arm 46 is secured by a pivot 47 to a block 48 which may slide in the space between a pair of guide bars 49 secured in a slot in the adjacent face of the slide plates 43. Vertically extending arms 51 of the bell cranks 44 are secured by pivots 52 to blocks 53 which extend within an annular slot 54 near the end of an adjusting shaft 55 which is mounted for movement longitudinally of its length. The shaft movement may be produced by a ram operated cam at the opposite end of the shaft from that illustrated, or by a thread, or by any other suitable means. The longitudinal movement of the shaft 55 rocks the bell cranks 44 to have the slides 43 move toward or away from each other. The support 8 for the tool 6 is located on the slides 43 by dowels 56 and is secured thereto by screws 57. The workpiece 28 is mounted adjacent to the supports 8, with the tools 6 thereon disposed inwardly of the annular surface 58 before the machine operation is commenced, which position is shown by the broken line 59.

The table 41 is driven in rotation at a predetermined speed and the shaft 55 is advanced toward the slides 43 to rock the arms 46 away from each other and thereby move the slides 43 outwardly to advance the tools 6 into contact with the inner edge of the surface 58 of the workpiece 28. The continued advancement of the shaft 55 moves the cutting corners of the tools across the surface 58 to the position illustrated in FIG. 5, with the surface accurately machined to a desirable finish. The cutting tool 6 at the right-hand side of the structure illustrated in FIG. 5 is employed as a roughing tool, removing the greater amount of material. The tool 6 at the left-hand side of the structure takes a very light cut and thereby produces a finishing operation. After the workpiece has been removed from the machine, the outward movement of the shaft 55 away from the slides 43 will move the slides inwardly toward each other to have the cutting corners of the tool 6 disposed inwardly of the surface 58 of the new workpiece to be machined.

What is claimed is:

1. In a machine, a rotatable non-advanceable support, radially movable slides on said support, means for moving said slides radially in opposite directions as the support is rotated, and a series of spaced blades on each said slide located different radial distances from the center having cutting corners for machining the face of a workpiece when moved thereacross, the corners of the blades on one slide being in a plane offset from the plane of those of the other slide for performing a roughing operation while those of the other slide perform a finishing operation.

2. In a machine, a support rotatable about a none advanceable center, radially movable slides on said support, a series of spaced cutting blades on said slides disposed in a common plane at different radial distances from the center, with the blades of each series disposed in stepped relation with the rearmost blade of the series relative to the direction of rotation having the greatest radial length and being shorter than the shortest length of radius of the following series, and means for advancing said slides in opposite directions from the center radially and the blades in paths parallel to each other and the path of their respective slide from said center during the rotation of the head.

References Cited by the Examiner
UNITED STATES PATENTS

| | | |
|---|---|---|
| 566,966 | 9/96 | Claussen. |
| 707,472 | 8/02 | Welter _____ 29—97 |
| 798,856 | 9/05 | Wetter _____ 29—97 |
| 1,595,898 | 8/26 | Loewy. |
| 2,069,296 | 2/37 | Woytych. |
| 2,269,641 | 1/42 | Woytych _____ 90—15 X |
| 2,348,089 | 5/44 | Niekirk. |
| 2,372,000 | 3/45 | Johanson. |
| 2,404,433 | 7/46 | Christman _____ 90—15 X |
| 2,937,552 | 5/60 | Hafensteiner _____ 90—15 |

FOREIGN PATENTS 19,607    10/01    Great Britain.

WILLIAM W. DYER, JR., *Primary Examiner.*